United States Patent
Arlt et al.

(10) Patent No.: US 8,082,731 B2
(45) Date of Patent: Dec. 27, 2011

(54) METHOD AND DEVICE FOR OPERATING AN INTERNAL COMBUSTION ENGINE

(75) Inventors: Tino Arlt, Regensburg (DE); Thomas Baumann, Regensburg (DE); Gerd Rösel, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 534 days.

(21) Appl. No.: 12/233,269

(22) Filed: Sep. 18, 2008

(65) Prior Publication Data

US 2009/0077951 A1  Mar. 26, 2009

(30) Foreign Application Priority Data

Sep. 20, 2007  (DE) .................. 10 2007 044 937

(51) Int. Cl.
*F01N 3/00* (2006.01)
*F01N 3/10* (2006.01)

(52) U.S. Cl. ............. 60/295; 60/274; 60/285; 60/300; 60/301

(58) Field of Classification Search .............. 60/273, 60/274, 284, 285, 300, 301, 303, 295
See application file for complete search history.

(56) References Cited

U.S. PATENT DOCUMENTS

| | | | |
|---|---|---|---|
| 4,112,879 A | 9/1978 | Assenheimer et al. | 123/32 |
| 4,569,319 A | 2/1986 | Thoma | 123/357 |
| 5,117,793 A | 6/1992 | Taue et al. | 123/436 |
| 5,906,187 A | 5/1999 | Heuer | 123/436 |
| 5,974,788 A | 11/1999 | Hepburn et al. | 60/274 |
| 6,044,826 A | 4/2000 | Bayerle et al. | 123/568.16 |
| 6,244,046 B1 | 6/2001 | Yamashita | 60/285 |
| 6,276,349 B1 | 8/2001 | Kofler et al. | 123/673 |
| 6,619,262 B2 | 9/2003 | Graf et al. | 123/435 |
| 6,644,284 B2 | 11/2003 | Pfitz | 123/479 |
| 6,820,474 B2 | 11/2004 | Rueger et al. | 73/119 |
| 7,219,003 B2 | 5/2007 | Hagel et al. | 701/104 |
| 7,331,214 B2 | 2/2008 | Aliakbarzadeh et al. | 73/23.32 |
| 7,360,523 B2 | 4/2008 | Sloane et al. | 123/305 |
| 7,392,789 B2 | 7/2008 | Dietl et al. | 123/436 |
| 2002/0148441 A1 | 10/2002 | Tuken | 123/436 |
| 2003/0097833 A1* | 5/2003 | Ingram et al. | 60/274 |
| 2006/0037312 A1* | 2/2006 | Yoshida et al. | 60/295 |
| 2006/0174610 A1* | 8/2006 | Brown et al. | 60/295 |
| 2007/0113546 A1 | 5/2007 | Jankovic | 60/287 |
| 2007/0214773 A1* | 9/2007 | Elwart | 60/285 |
| 2008/0260610 A1* | 10/2008 | Theis et al. | 423/213.2 |
| 2009/0165758 A1* | 7/2009 | Nishiumi et al. | 123/568.21 |

FOREIGN PATENT DOCUMENTS

DE   3839611   5/1990
(Continued)

OTHER PUBLICATIONS

International Search Report and Written Opinion for Application No. PCT/EP2007/052575 (17 pages), Nov. 19, 2007.

*Primary Examiner* — Thomas Denion
*Assistant Examiner* — Audrey K Bradley
(74) *Attorney, Agent, or Firm* — King & Spalding L.L.P.

(57) ABSTRACT

An internal combustion engine has a NOX storage catalyst. A storage capacity (NOX_STC) of the NOX storage catalyst is determined for the purpose of operating the internal combustion engine. The temperature (TEMP) of the NOX storage catalyst is increased if the storage capacity (NOX_STC) is less than a predefined threshold value.

15 Claims, 3 Drawing Sheets

FOREIGN PATENT DOCUMENTS

| | | |
|---|---|---|
| DE | 4104742 | 9/1991 |
| DE | 19812305 | 9/1999 |
| DE | 19846393 | 4/2000 |
| DE | 10034144 | 1/2002 |
| DE | 10240476 | 3/2004 |
| DE | 102004044808 | 6/2004 |
| DE | 69821171 | 11/2004 |
| DE | 102004004291 | 1/2005 |
| DE | 102004006554 | 6/2005 |
| DE | 102004030757 | 1/2006 |
| DE | 69933091 | 3/2007 |
| EP | 0795686 | 9/1997 |
| GB | 2344771 A * | 6/2000 |
| WO | WO 2007066835 A1 * | 6/2007 |

* cited by examiner

METHOD AND DEVICE FOR OPERATING AN INTERNAL COMBUSTION ENGINE

CROSS-REFERENCE TO RELATED APPLICATIONS

This application claims priority to German application number 10 2007 044 937.4 filed Sep. 20, 2007, the contents of which is hereby incorporated by reference in its entirety.

TECHNICAL FIELD

The invention relates to a method and device for operating an internal combustion engine having a NOX storage catalyst.

BACKGROUND

The ability of a NOX storage catalyst to store oxides of nitrogen decreases with increasing age. The storage capacity decreases above all in a lower temperature range of the NOX storage catalyst. The NOX storage catalyst can be operated in a temperature range of 200 to 500 degrees Celsius, for example. The storage capacity then decreases substantially in the range from 200 to 300 degrees Celsius, for example. In contrast thereto, the storage capacity can decrease only slightly in the range above 300 degrees Celsius during the same period of operation.

SUMMARY

A method and a device for operating an internal combustion engine can be created which contribute in a simple manner toward low-emission operation of the internal combustion engine, in particular over a long period of operation of a NOX storage catalyst of the internal combustion engine.

According to an embodiment, a method for operating an internal combustion engine having a NOX storage catalyst, may comprise the steps of:—determining the storage capacity of the NOX storage catalyst, and—increasing the temperature of the NOX storage catalyst if the storage capacity is less than a predefined threshold value.

According to another embodiment, a device for operating an internal combustion engine having a NOX storage catalyst, wherein the device may be operable to determine the storage capacity of the NOX storage catalyst, to increase the temperature of the NOX storage catalyst if the storage capacity is less than a predefined threshold value.

According to a further embodiment, the storage capacity of the NOX storage catalyst at a predefined temperature within a predefined temperature range of the NOX storage catalyst can be determined, and the temperature of the NOX storage catalyst can be increased such that its temperature lies above the predefined temperature range if the storage capacity within the predefined temperature range is less than the predefined threshold value. According to a further embodiment, the storage capacity of the NOX storage catalyst at a predefined temperature of the NOX storage catalyst can be determined, and the temperature can be increased by a predefined temperature increment if the storage capacity at the predefined temperature is less than the predefined threshold value. According to a further embodiment, a curve of the storage capacity can be determined as a function of the temperature of the NOX storage catalyst, and the gradient of the curve of the storage capacity can be determined, the temperature to which the NOX storage catalyst is heated can be determined, and/or the temperature increment can be predefined, as a function of the determined gradient. According to a further embodiment, the predefined temperature range may lie between 250 and 300 degrees Celsius.

BRIEF DESCRIPTION OF THE DRAWINGS

Exemplary embodiments of the invention are explained in more detail below with reference to schematic drawings, in which.

Figure 1:
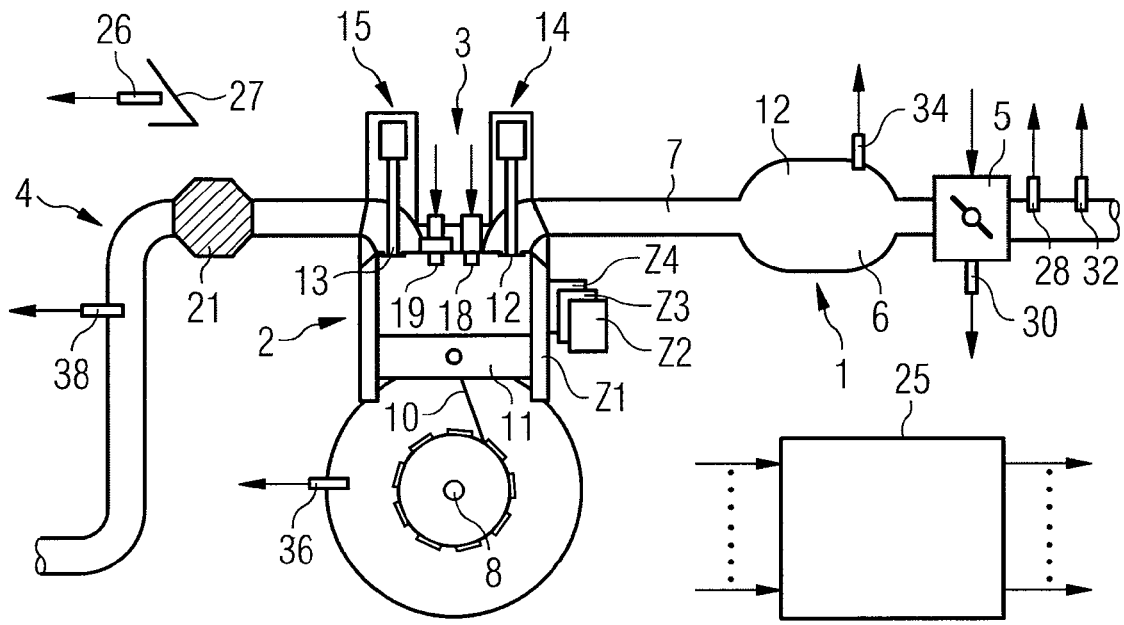
FIG. 1 shows an internal combustion engine.

Elements of identical construction or function are identified by the same reference signs throughout the figures.

DETAILED DESCRIPTION

According to an embodiment, in a method and a device for operating an internal combustion engine, the internal combustion engine has a NOX storage catalyst, wherein the storage capacity of the NOX storage catalyst is determined. The temperature of the NOX storage catalyst is increased if the storage capacity is less than a predefined threshold value. This contributes in a simple manner toward the low-emission operation of the internal combustion engine, in particular over the long period of operation of the NOX storage catalyst. The threshold value can be predefined statically or be determined as a function of the temperature of the NOX storage catalyst, with reference to an engine characteristic map, for example.

The information that the temperature of the NOX storage catalyst is being increased can be preferably stored on a storage medium of a control device of the internal combustion engine and is thus available to further functions of the internal combustion engine.

In an embodiment, the storage capacity of the NOX storage catalyst at a predefined temperature within a predefined temperature range of the NOX storage catalyst is determined. The temperature of the NOX storage catalyst is increased such that its temperature lies above the predefined temperature range if the storage capacity within the predefined temperature range is less than the predefined threshold value. This can contribute particularly effectively toward low-emission operation of the internal combustion engine since the NOX storage catalyst loses storage capacity at different rates in different temperature ranges.

In a further embodiment, the storage capacity of the NOX storage catalyst at the predefined temperature of the NOX storage catalyst is determined. The temperature is increased by a predefined temperature increment if the storage capacity at the predefined temperature is less than the predefined threshold value. This allows the temperature of the NOX storage catalyst to be increased in a particularly simple manner.

In a further embodiment, a curve of the storage capacity is determined as a function of the temperature of the NOX storage catalyst. A gradient of the storage capacity curve is determined. The temperature increment is predefined and/or the temperature to which the NOX storage catalyst is heated is determined as a function of the determined gradient. This contributes toward increasing the temperature specifically such that the storage capacity is adequate and yet a minimum of energy is consumed for the purpose of heating the NOX storage catalyst.

In a further embodiment, the predefined temperature range lies between 250 and 300 degrees Celsius. This contributes particularly effectively toward the low-emission operation of the internal combustion engine since the storage capacity diminishes particularly rapidly between 250 and 300 degrees Celsius.

An internal combustion engine (FIG. 1) comprises an intake tract 1, an engine block 2, a cylinder head 3 and an exhaust gas tract 4. The intake tract 1 preferably may include a throttle valve 5, a manifold 6 and an intake pipe 7 which is routed toward a cylinder Z1 via an inlet port into a combustion chamber of the engine block 2. The engine block 2 also includes a crankshaft 8 which is coupled to a piston 11 of the cylinder Z1 by way of a piston rod 10. In addition to the cylinder Z1 the internal combustion engine preferably may comprise further cylinders Z1-Z4, but can also comprise any arbitrary greater number of cylinders Z1-Z4. The internal combustion engine can be preferably disposed in a motor vehicle.

The cylinder head 3 comprises a valve train 14, 15 which is coupled to a gas inlet valve 12 and a gas outlet valve 13 respectively. The valve train 14, 15 includes at least one camshaft which is coupled to the crankshaft 8. Preferably also disposed in the cylinder head 3 may be an injection valve 18 and, if the internal combustion engine is not a diesel internal combustion engine, a spark plug 19. Alternatively the injection valve 18 can also be disposed in the intake pipe 7. A NOX storage catalyst 21 is disposed in the exhaust gas tract 4.

A control device 25 is provided to which sensors are assigned which record different measured variables and in each case determine the measured value of the measured variable. As a function of at least one of the measured variables the control device 25 determines actuating variables which are then converted into one or more actuating signals for controlling the actuating elements by means of corresponding actuators. The control device 25 can also be referred to as a device for operating the internal combustion engine and/or as an engine control unit.

The sensors are, for example, a pedal position sensor 26 which registers a pedal position of an accelerator pedal 27, an air mass sensor 28 which measures a mass air flow upstream of the throttle valve 5, a temperature sensor 32 which registers an intake air temperature, a throttle valve position sensor 30 which registers a degree of opening of the throttle valve 5, an intake pipe pressure sensor 34 which measures an intake pipe pressure in the manifold 6, a crankshaft angle sensor 36 which measures a crankshaft angle to which a rotational speed of the internal combustion engine is then assigned, and/or a NOX sensor 38 which measures a nitrogen oxide content of the exhaust gas of the internal combustion engine.

Depending on the embodiment variant, an arbitrary subset of the cited sensors may be present or additional sensors may also be present.

The actuating elements are, for example, the throttle valve 5, the gas inlet and outlet valves 12, 13, the injection valve 18 and/or the spark plug 19.

Figure 2:
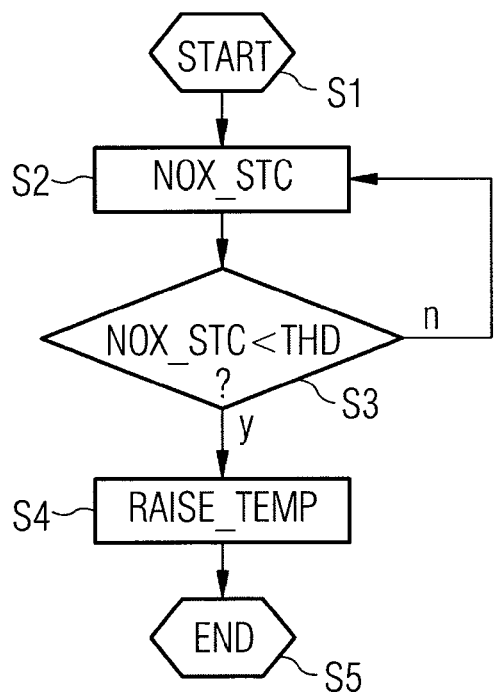
FIG. 2 is a flowchart of a first program for operating the internal combustion engine.

A first program for operating the internal combustion engine can be preferably stored on a storage medium of the control device 25 (FIG. 2). If the storage capacity NOX_STC of the NOX storage catalyst 21 is too small, the first program is used to increase the storage capacity NOX_STC by increasing the temperature TEMP (FIG. 3) of the NOX storage catalyst 21.

The first program can be preferably started in a step S1, for example close in time to a starting of the engine, with variables possibly being initialized in step S1.

The storage capacity NOX_STC of the NOX storage catalyst 21 is determined in a step S2. The storage capacity NOX_STC can be determined, for example, by means of a nitrogen oxide emissions model as a function of different operating parameters, for example a load variable, for example the mass air flow, and/or the rotational speed, and as a function of a measured signal of the NOX sensor 38 downstream of the NOX storage catalyst 21.

In a step S3, a check is made to determine whether the storage capacity NOX_STC is less than a predefined threshold value THD. If the condition of step S3 is met, the processing is continued in a step S4. If the condition of step S3 is not met, the processing is continued in step S2.

In a step S4, the temperature TEMP of the NOX storage catalyst 21 is increased by means of a temperature increase instruction RAISE_TEMP. The temperature TEMP of the NOX storage catalyst 21 can be increased by way of a thermal coupling to a heating device. Preferably, however, the temperature TEMP of the NOX storage catalyst 21 can be increased by increasing the exhaust gas temperature of the exhaust gas of the internal combustion engine. The exhaust gas temperature can be set for example by way of opening times of the gas inlet valves 12 and/or gas outlet valves 13 and/or by variation of operating parameters such as, for example, ignition cable, fuel quantity/mass.

The first program can be terminated in a step S5. Preferably, however, the first program can be executed at regular intervals during the operation of the internal combustion engine.

Figure 3:
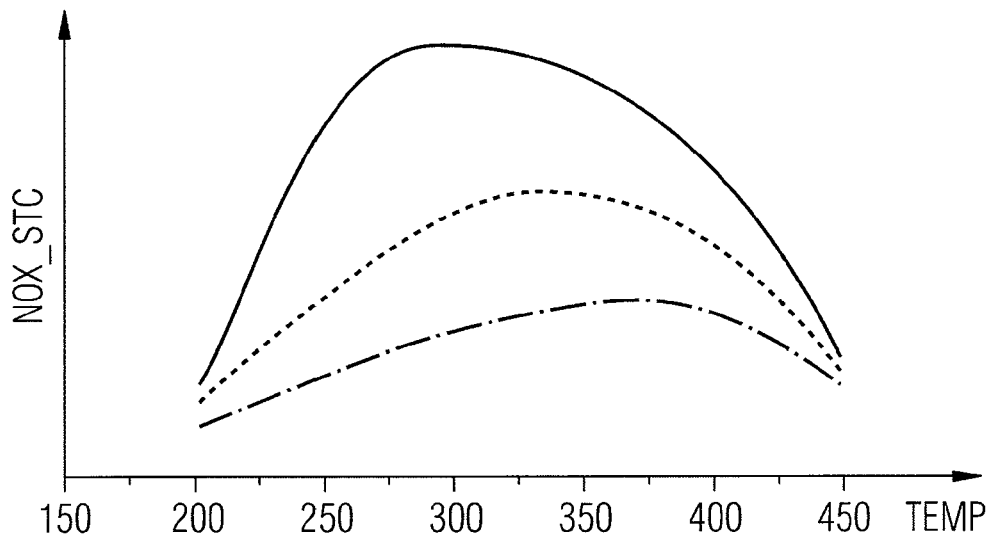
FIG. 3 shows different curves of storage capacities of a NOX storage catalyst as a function of the temperature.

The NOX storage catalyst 21 operates effectively from a temperature of 200 degrees Celsius (FIG. 3). In the case of a new NOX storage catalyst 21 (continuous line), the storage capacity NOX_STC increases up to approx. 300 degrees Celsius and then falls away again down to 450 degrees Celsius (FIG. 3). In the case of a NOX storage catalyst 21 having been in operation for a relatively long period of time (dashed line), the storage capacity NOX_STC is radically reduced, particularly in the range from 250 to 300 degrees Celsius. On the other hand, it continues to decrease only insignificantly above 300 degrees Celsius, in particular at 400 to 450 degrees Celsius. In the case of a NOX storage catalyst 21 having been in operation for an even longer period of time (dash-dotted line), the storage capacity NOX_STC decreases more radically still, particularly in the range from 250 to 300 degrees Celsius.

Figure 4:
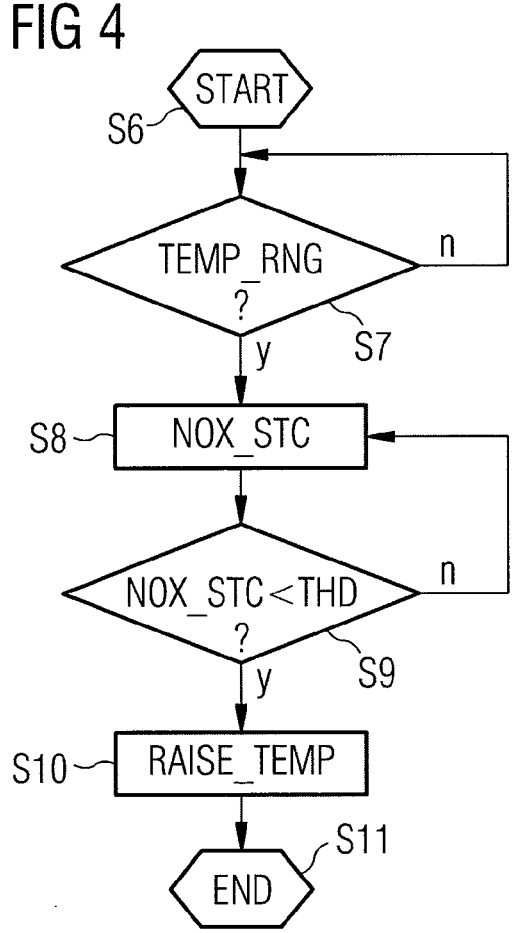
FIG. 4 is a flowchart of a second program for operating the internal combustion engine.

Alternatively or in addition to the first program, a second program for operating the internal combustion engine is therefore stored on the storage medium of the control device 25 (FIG. 4). The second program is used to raise the storage capacity NOX_STC, in particular in a predefined temperature range TEMP_RNG of the NOX storage catalyst 21, by increasing the temperature TEMP of the NOX storage catalyst 21.

The second program can be preferably started in a step S6 corresponding to step S1 of the first program.

In a step S7, a check is made to determine whether the NOX storage catalyst 21 has a temperature TEMP which lies in the predefined temperature range TEMP_RNG. If the condition of step S7 is met, the processing is continued in a step S8. If the condition of step S7 is not met, the processing is continued again in step S7.

Steps S8 and S9 of the second program can be executed in a corresponding manner to steps S2 and S3 of the first program.

If the condition of step S9 is not met, the processing is continued again in step S8. If the condition of step S9 is met, the processing is continued in a step S10.

In step S10, the temperature TEMP of the NOX storage catalyst 21 is raised by means of the temperature increase instruction RAISE_TEMP, preferably to such an extent that the temperature TEMP lies above the predefined temperature range TEMP_RNG.

The second program for operating the internal combustion engine can be terminated in a step S11. Preferably, however, the second program for operating the internal combustion engine may be executed at regular intervals during the operation of the internal combustion engine.

Figure 5:
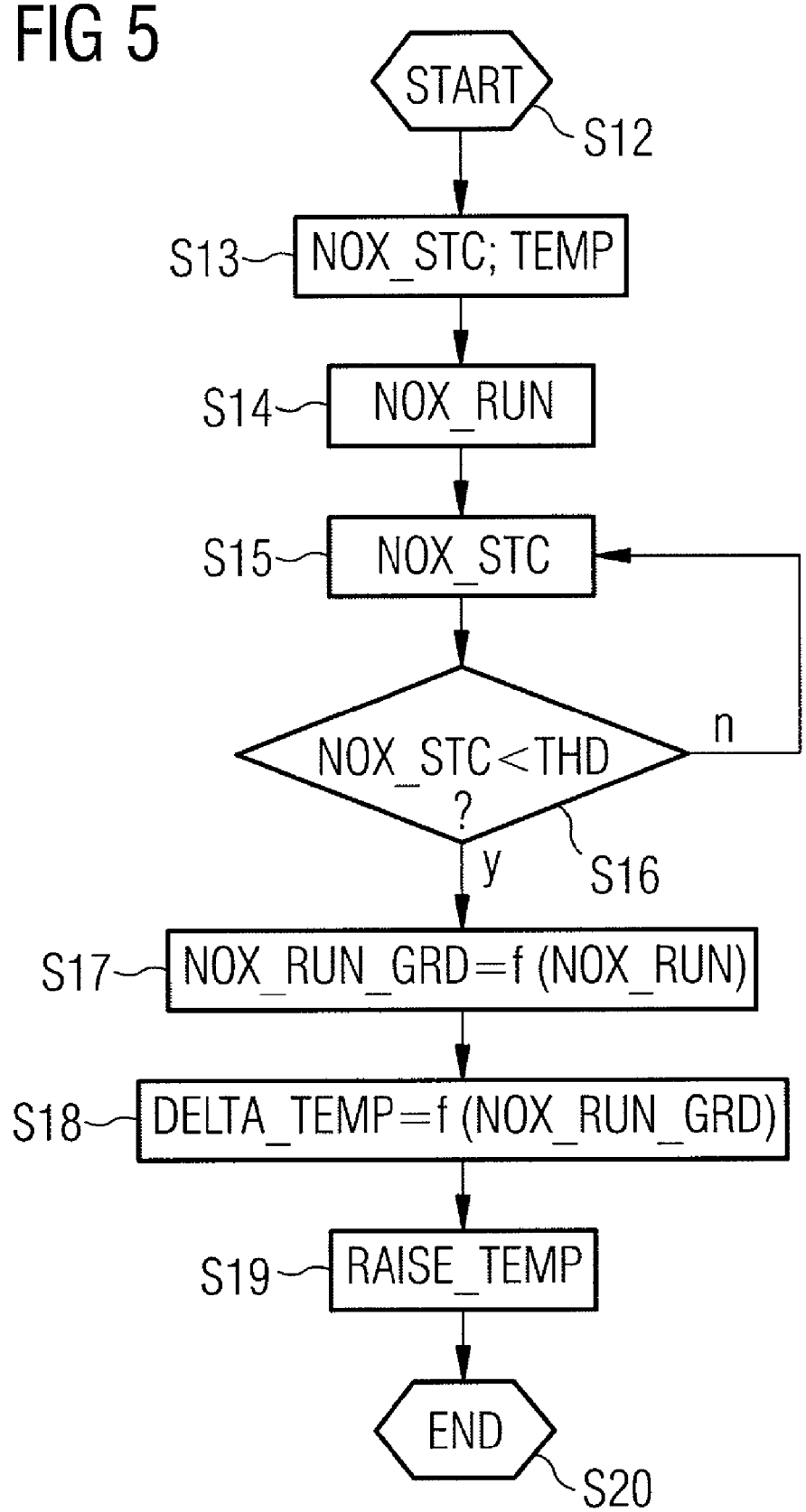
FIG. 5 is a flowchart of a third program for operating the internal combustion engine.

Alternatively or in addition, a third program for operating the internal combustion engine is stored on the storage medium of the control device 25 (FIG. 5). The third program is used to increase the temperature incrementally if the storage capacity NOX_STC of the NOX storage catalyst 21 is too small. This can contribute in a particularly simple manner toward the temperature TEMP of the NOX storage catalyst 21 not being increased to an unnecessarily high level.

The third program can be preferably started in a step S12, after a starting of the engine, for example, with variables possibly being initialized in step S12.

In a step S13, the storage capacity NOX_STC is determined, in accordance with step S2 of the first program, for example.

In a step S14, the storage capacity NOX_STC is stored as a function of the temperature TEMP, such that a curve NOX_RUN of the storage capacity is recorded as a function of time.

Steps S15 and S16 of the third program can be executed in a corresponding manner to steps S2 and S3 of the first program.

If the condition of step S16 is met, the processing is continued in a step S17. If the condition of step S16 is not met, the processing is continued again in step S15.

In step S17, a gradient NOX_RUN_GRD of the curve NOX_RUN of the storage capacity NOX_STC is determined as a function of the curve NOX_RUN of the storage capacity NOX_STC.

In a step S18, a temperature increment DELTA_TEMP is determined. For example, the temperature increment DELTA_TEMP can turn out all the smaller, the greater the gradient NOX_RUN_GRD of the curve NOX_RUN of the storage capacity NOX_STC.

In step S19, the temperature of the NOX storage catalyst 21 is increased, preferably by the temperature increment DELTA_TEMP, by means of the temperature increase instruction RAISE_TEMP.

The third program can be terminated in a step S20. Preferably, however, the third program may be executed at regular intervals during the operation of the internal combustion engine.

What is claimed is:

1. A method for operating an internal combustion engine having a NOX storage catalyst, comprising the steps of:
    determining the storage capacity of the NOX storage catalyst,
    comparing the determined storage capacity of the NOX storage catalyst with a predefined storage capacity threshold value,
    determining a curve of the storage capacity as a function of the temperature of the NOX storage catalyst,
    determining a gradient of the curve of the storage capacity, and
    increasing the temperature of the NOX storage catalyst if the storage capacity is less than the predefined storage capacity threshold value, wherein a temperature to which the NOX storage catalyst is heated is determined, or a temperature increment by which to increase the temperature is predefined, as a function of the determined gradient of the curve of the storage capacity.

2. The method according to claim 1, wherein
    the storage capacity of the NOX storage catalyst at a predefined temperature of the NOX storage catalyst is determined, and
    the temperature is increased by a predefined temperature increment if the storage capacity at the predefined temperature is less than the predefined threshold value.

3. The method according to claim 1, wherein
    the temperature to which the NOX storage catalyst is heated is determined, and the temperature increment by which to increase the temperature is predefined, as a function of the determined gradient of the curve of the storage capacity.

4. The method according to claim 1, wherein
    the storage capacity of the NOX storage catalyst at a predefined temperature within a predefined temperature range of the NOX storage catalyst is determined, and
    the temperature of the NOX storage catalyst is increased such that its temperature lies above the predefined temperature range if the storage capacity within the predefined temperature range is less than the predefined threshold value.

5. The method according to claim 4, wherein the predefined temperature range lies between 250 and 300 degrees Celsius.

6. A device for operating an internal combustion engine having a NOX storage catalyst, wherein the device is operable
    to determine the storage capacity of the NOX storage catalyst,
    to compare the determined storage capacity of the NOX storage catalyst with a predefined storage capacity threshold value,
    to determine a curve of the storage capacity as a function of the temperature of the NOX storage catalyst,
    to determine a gradient of the curve of the storage capacity, and
    to increase the temperature of the NOX storage catalyst if the storage capacity is less than the predefined storage capacity threshold value, wherein a temperature to which the NOX storage catalyst is heated is determined, or a temperature increment by which to increase the temperature is predefined, as a function of the determined gradient of the curve of the storage capacity.

7. The device according to claim 6, wherein the device is operable
    to determine the storage capacity of the NOX storage catalyst at a predefined temperature of the NOX storage catalyst, and
    to increase the temperature by a predefined temperature increment if the storage capacity at the predefined temperature is less than the predefined threshold value.

8. The device according to claim 6, wherein the device is operable
    to determine the temperature to which the NOX storage catalyst is heated, and to predefine the temperature increment by which to increase the temperature as a function of the determined gradient of the curve of the storage capacity.

9. The device according to claim 6, wherein the device is operable:
to determine the storage capacity of the NOX storage catalyst at a predefined temperature within a predefined temperature range of the NOX storage catalyst, and
to increase the temperature of the NOX storage catalyst such that its temperature lies above the predefined temperature range if the storage capacity within the predefined temperature range is less than the predefined threshold value.

10. The device according to claim 9, wherein the predefined temperature range lies between 250 and 300 degrees Celsius.

11. A non-transitory computer-readable medium containing program code, the program code when executed by a processor performing a method for operating an internal combustion engine having a NOX storage catalyst, comprising the steps of:
determining the storage capacity of the NOX storage catalyst,
comparing the determined storage capacity of the NOX storage catalyst with a predefined storage capacity threshold value, and
determining a curve of the storage capacity as a function of the temperature of the NOX storage catalyst,
determining a gradient of the curve of the storage capacity, and
increasing the temperature of the NOX storage catalyst if the storage capacity is less than the predefined storage capacity threshold value, wherein the temperature to which the NOX storage catalyst is heated is determined, or a temperature increment by which to increase the temperature is predefined, as a function of the determined gradient of the curve of the storage capacity.

12. The storage medium according to claim 11, wherein
the storage capacity of the NOX storage catalyst at a predefined temperature of the NOX storage catalyst is determined, and
the temperature is increased by a predefined temperature increment if the storage capacity at the predefined temperature is less than the predefined threshold value.

13. The storage medium according to claim 11, wherein
the temperature to which the NOX storage catalyst is heated is determined, and the temperature increment by which to increase the temperature is predefined, as a function of the determined gradient of the curve of the storage capacity.

14. The storage medium according to claim 11, wherein
the storage capacity of the NOX storage catalyst at a predefined temperature within a predefined temperature range of the NOX storage catalyst is determined, and
the temperature of the NOX storage catalyst is increased such that its temperature lies above the predefined temperature range if the storage capacity within the predefined temperature range is less than the predefined threshold value.

15. The storage medium according to claim 14, wherein the predefined temperature range lies between 250 and 300 degrees Celsius.

* * * * *